(12) United States Patent
Wesling et al.

(10) Patent No.: US 10,677,312 B2
(45) Date of Patent: Jun. 9, 2020

(54) FRICTION SHAFT DAMPER FOR AXIAL VIBRATION MODE

(71) Applicant: General Electric Company, Schenectady, NY (US)

(72) Inventors: Richard Alan Wesling, Cincinnati, OH (US); Nathan Evan McCurdy Gibson, West Chester, OH (US)

(73) Assignee: General Electric Company, Schenectady, NY (US)

( * ) Notice: Subject to any disclaimer, the term of this patent is extended or adjusted under 35 U.S.C. 154(b) by 170 days.

(21) Appl. No.: 15/897,232

(22) Filed: Feb. 15, 2018

(65) Prior Publication Data

US 2019/0249747 A1 Aug. 15, 2019

(51) Int. Cl.
| | |
|---|---|
| *F16F 15/12* | (2006.01) |
| *F01D 25/04* | (2006.01) |
| *F16F 15/129* | (2006.01) |
| *F01D 5/10* | (2006.01) |
| *F01D 5/02* | (2006.01) |

(Continued)

(52) U.S. Cl.
CPC .......... *F16F 15/1201* (2013.01); *F01D 5/026* (2013.01); *F01D 5/10* (2013.01); *F01D 25/04* (2013.01); *F16F 15/129* (2013.01); *F02C 7/28* (2013.01); *F02K 3/04* (2013.01); *F05D 2260/96* (2013.01)

(58) Field of Classification Search
CPC . F01D 25/04; F16F 15/1201; F16F 15/13107; F16F 15/133; F16F 15/1421; F16F 15/139; F16F 15/13128; F16F 15/1392; F16F 15/14; F16F 15/1414; F16F 15/145; F16F 15/129; F16F 15/131; F16F 15/1457; F16F 15/1442; F16F 15/322; Y10T 464/50; F16D 2300/22
USPC ........................................................ 464/180
See application file for complete search history.

(56) References Cited

U.S. PATENT DOCUMENTS

| | | | | |
|---|---|---|---|---|
| 2,028,930 A | * | 1/1936 | Taylor ..................... | H02G 7/14 174/42 |
| 2,285,681 A | | 6/1942 | Rushing | |

(Continued)

FOREIGN PATENT DOCUMENTS

DE 4340293 A1 * 6/1995 ............ F16F 15/145

*Primary Examiner* — Woody A Lee, Jr.
*Assistant Examiner* — Brian Christopher Delrue
(74) *Attorney, Agent, or Firm* — General Electric; Pamela Kachur (57) ABSTRACT

Friction shaft damper includes springy projections pressing against inside surface of a portion of rotor such as drive shaft with spring force. Central mass may be positioned inside surface of drive shaft by projections extending outwardly from central mass and slideably engaging inside surface of drive shaft. Enlarged section or chamber of shaft may surround and axially trap damper. Axially spaced apart sets of springy fingers may position mass inside shaft and radially inner ends of fingers may be secured to mass and radially outer ends of fingers may be positioned and free to slide along inside surface of shaft. Two axially spaced apart annular deflection limiters may be placed around mass with small clearances C between deflection limiters and inside surface of shaft. Damper may be a multi-lobed wave spring having multi-lobed rim attached to mass by struts. Damper may be multi-lobed wave spring with crests.

20 Claims, 10 Drawing Sheets

(51) Int. Cl.
*F02K 3/04* (2006.01)
*F02C 7/28* (2006.01)

(56) References Cited

U.S. PATENT DOCUMENTS

| | | | | |
|---|---|---|---|---|
| 3,075,406 A * | 1/1963 | Butler, Jr. | F16F 15/1442 | 74/574.4 |
| 3,680,407 A * | 8/1972 | Doehring | B60K 17/22 | 74/574.2 |
| 3,770,191 A * | 11/1973 | Blum | B04B 9/12 | 494/46 |
| 3,814,549 A | 6/1974 | Cronstedt | | |
| 4,043,431 A * | 8/1977 | Ellege | B23Q 17/0976 | 188/379 |
| 4,090,711 A * | 5/1978 | Amato | A63B 69/3632 | 473/232 |
| 4,207,957 A * | 6/1980 | Sivers | B60K 17/22 | 180/380 |
| 4,214,796 A | 7/1980 | Monzel et al. | | |
| 4,237,703 A * | 12/1980 | Wahl, Jr. | F16D 3/02 | 310/103 |
| 4,273,229 A * | 6/1981 | Voll | D01H 4/12 | 192/105 CF |
| 4,281,967 A * | 8/1981 | Mouille | B64C 27/001 | 416/145 |
| 4,337,982 A | 7/1982 | Moringiello et al. | | |
| 4,361,213 A * | 11/1982 | Landis, Jr. | F01D 11/02 | 188/378 |
| 4,483,426 A | 11/1984 | Tagawa et al. | | |
| 4,516,955 A * | 5/1985 | Worner | F16F 15/1435 | 188/379 |
| 4,667,530 A * | 5/1987 | Mettler | B62D 1/185 | 403/225 |
| 4,706,788 A * | 11/1987 | Inman | F16F 7/10 | 188/268 |
| 5,013,282 A * | 5/1991 | Keller | A01G 3/08 | 464/172 |
| 5,053,662 A * | 10/1991 | Richter | F01D 25/04 | 290/40 A |
| 5,138,902 A * | 8/1992 | Muller | F16F 15/1442 | 192/201 |
| 5,185,543 A * | 2/1993 | Tebbe | B60K 17/22 | 123/192.1 |
| 5,205,189 A * | 4/1993 | Wesling | F01D 5/027 | 464/180 |
| 5,326,324 A * | 7/1994 | Hamada | F16F 15/1442 | 464/180 |
| 5,328,408 A * | 7/1994 | Wolf | F16F 15/1442 | 464/180 |
| 5,346,362 A * | 9/1994 | Bonner | F01D 11/005 | 415/119 |
| 5,417,614 A * | 5/1995 | Dykema | B62D 1/192 | 280/777 |
| 5,421,221 A * | 6/1995 | Warchocki | E05F 5/00 | 160/310 |
| 5,440,949 A * | 8/1995 | Leibman | B23Q 11/0035 | 269/47 |
| 5,460,574 A * | 10/1995 | Hobaugh | F16C 3/03 | 403/359.2 |
| 5,630,704 A * | 5/1997 | Gilgenbach | B63H 23/34 | 416/134 R |
| 5,707,064 A * | 1/1998 | Vance | F01D 25/04 | 277/414 |
| 5,829,306 A * | 11/1998 | Komazaki | F16H 55/14 | 74/411 |
| 5,868,627 A | 2/1999 | Stark et al. | | |
| 5,901,616 A * | 5/1999 | Miner | B64C 27/001 | 416/145 |
| 6,234,911 B1 * | 5/2001 | Breese | F16F 15/322 | 464/183 |
| 6,312,340 B1 * | 11/2001 | Gassen | F16F 15/1435 | 180/902 |
| 6,354,988 B1 * | 3/2002 | Carson | B04B 9/12 | 464/180 |
| 6,377,145 B1 | 4/2002 | Kumagai | | |
| 6,463,827 B1 * | 10/2002 | Oetiker | F16F 15/34 | 74/570.2 |
| 6,480,363 B1 * | 11/2002 | Prater | F16C 27/04 | 360/265.7 |
| 6,536,566 B2 * | 3/2003 | Hasegawa | B60G 13/16 | 188/378 |
| 6,725,985 B2 * | 4/2004 | Haneishi | F16F 15/1442 | 188/379 |
| 6,736,246 B2 * | 5/2004 | Haneishi | F16F 15/1428 | 188/379 |
| 6,837,345 B1 * | 1/2005 | Lauble | F16F 1/371 | 188/378 |
| 6,966,413 B2 * | 11/2005 | Haneishi | F16F 15/1214 | 188/379 |
| 6,986,713 B2 | 1/2006 | Dine et al. | | |
| 7,044,276 B2 * | 5/2006 | Haneishi | F16F 15/1442 | 188/379 |
| 7,192,357 B2 | 3/2007 | Kawakami | | |
| 7,320,381 B2 * | 1/2008 | Patrascu | B60K 17/22 | 180/381 |
| 8,303,255 B2 * | 11/2012 | Ramlogan | G01M 1/36 | 416/144 |
| 8,323,118 B2 * | 12/2012 | Ikeda | F16F 15/1442 | 188/380 |
| 8,454,449 B2 * | 6/2013 | Ball | F16C 3/02 | 464/180 |
| 8,863,390 B1 | 10/2014 | Ley et al. | | |
| 8,973,463 B2 * | 3/2015 | Manzoor | F16F 7/108 | 464/180 |
| 9,033,807 B1 * | 5/2015 | Ley | B21D 39/04 | 29/428 |
| 10,094,460 B1 * | 10/2018 | Durham | F16H 45/02 | |
| 2002/0177485 A1 * | 11/2002 | Cermak | F16C 3/035 | 464/167 |
| 2003/0183039 A1 * | 10/2003 | Ohta | B60N 3/102 | 464/180 |
| 2004/0007858 A1 * | 1/2004 | Simonian | B62D 7/222 | 280/731 |
| 2007/0193404 A1 * | 8/2007 | Rohs | F16F 15/13142 | 74/574.4 |
| 2007/0204453 A1 * | 9/2007 | Sun | F16F 15/322 | 29/407.07 |
| 2009/0197690 A1 * | 8/2009 | Lyscio | F16C 3/02 | 464/180 |
| 2009/0221376 A1 * | 9/2009 | Movlazada | F16F 15/12306 | 464/180 |
| 2012/0168270 A1 * | 7/2012 | Takikawa | F16F 15/145 | 188/378 |
| 2012/0180500 A1 * | 7/2012 | DiCintio | F01D 9/023 | 60/796 |
| 2013/0123029 A1 * | 5/2013 | Eichinger | F16D 3/14 | 464/180 |
| 2014/0079537 A1 * | 3/2014 | Arnold | F01D 5/027 | 415/119 |
| 2014/0155180 A1 * | 6/2014 | Leonard | F16D 3/80 | 464/81 |
| 2014/0353108 A1 * | 12/2014 | Tokumoto | F16D 13/56 | 192/66.31 |
| 2015/0369080 A1 * | 12/2015 | Arghir | F16C 35/077 | 415/119 |
| 2016/0138421 A1 * | 5/2016 | Duong | F16C 27/04 | 384/581 |
| 2016/0195160 A1 * | 7/2016 | Leinfelder | F16F 15/1442 | 464/87 |
| 2016/0319889 A1 * | 11/2016 | Ijames, Jr. | F16D 13/686 | |
| 2017/0268648 A1 * | 9/2017 | Kawahara | F16F 15/12353 | |
| 2017/0298995 A1 * | 10/2017 | Serkh | F16D 7/022 | |
| 2018/0073569 A1 * | 3/2018 | Patino Crespo | F16D 13/64 | |

* cited by examiner

FRICTION SHAFT DAMPER FOR AXIAL VIBRATION MODE

TECHNICAL FIELD

The present invention relates generally to damping of a shaft of a rotating machine subject to an axial vibration mode.

BACKGROUND INFORMATION

Gas turbine engines and other types of turbo-machinery are often used to drive loads such as electrical generators. Shafts connecting turbines to compressors of such gas turbine engines may be subject to axial vibrations. Conventional friction dampers in rotating parts of the engines may not work, because of high rotor speed which creates too much centrifugal force to allow the damper to slip. There is a desire to provide friction dampers to dampen gas turbine engine axial vibrations. There is a desire to provide friction dampers to dampen gas turbine engine axial vibrations of gas turbine engines and other types of turbo-machinery used to drive loads such as electrical generators.

SUMMARY OF THE INVENTION

A friction shaft damper assembly includes a friction shaft damper with springy projections pressing against an inside surface of a portion of a rotor with a spring force.

The friction shaft damper assembly may further include the rotor being a drive shaft and the friction shaft damper including a central mass positioned inside the drive shaft by the springy projections extending outwardly from and attached or connected to the central mass. The springy projections slideably engage the inside surface of the drive shaft. An enlarged section or chamber of the drive shaft may surround and axially trap the friction shaft damper.

The central mass may be positioned inside the drive shaft by at least two axially spaced apart sets of springy fingers. Radially inner ends of the fingers may be secured and attached to the central mass and radially outer ends of the fingers may be positioned and free to axially slide along an inside surface of the drive shaft. The fingers may have a spiral shape or logarithmic spiral shape.

The friction shaft, damper assembly may include at least two axially spaced apart annular deflection limiters around the central mass and a small clearances C between the deflection limiters and the inside surface of the drive shaft. Each of the annular deflection limiters may include radial spokes extending radially outwardly from an annular hub circumscribing the central mass and the radial spokes extending radially outwardly to an annular rim.

The friction shaft damper may further include a multi-lobed wave spring having a multi-lobed rim attached or connected to the central mass by struts, radially inner ends of the struts attached to the central mass, and radially outer ends of the struts attached to the multi-lobed rim. The multi-lobed rim may have a wavy shape and the multi-lobed rim may include lobes, radially inner troughs, and radially outer crests. The radially outer crests may be positioned relative to and free to slide along the inside surface of the drive shaft. The radially outer ends of the struts may be attached to the radially inner troughs.

The friction shaft damper may be disposed within a drive shaft drivingly connecting a turbine section to a compressor section of a gas turbine engine. An electrical generator may also be drivenly connected to the turbine section by the drive shaft and the friction shaft damper may be located in an enlarged section or chamber of the drive shaft and in the electrical generator.

An alternative embodiment of the friction shaft damper includes a multi-lobed wave spring having a wavy shape, lobes, radially inner troughs, and radially outer crests. The crests are the springy projections and positioned relative to and free to slide along the inside surface. The multi-lobed wave spring may sit at least partially inside the portion of the rotor of the engine. The portion of the rotor may include a rotating labyrinth seal having knife edge seals which seal against a non-rotating seal land and the multi-lobed wave spring may be within the rotating seal.

BRIEF DESCRIPTION OF THE DRAWINGS

The invention, in accordance with preferred and exemplary embodiments, is more particularly described in the following detailed description taken in conjunction with the accompanying drawings in which.

DESCRIPTION

Figure 1:
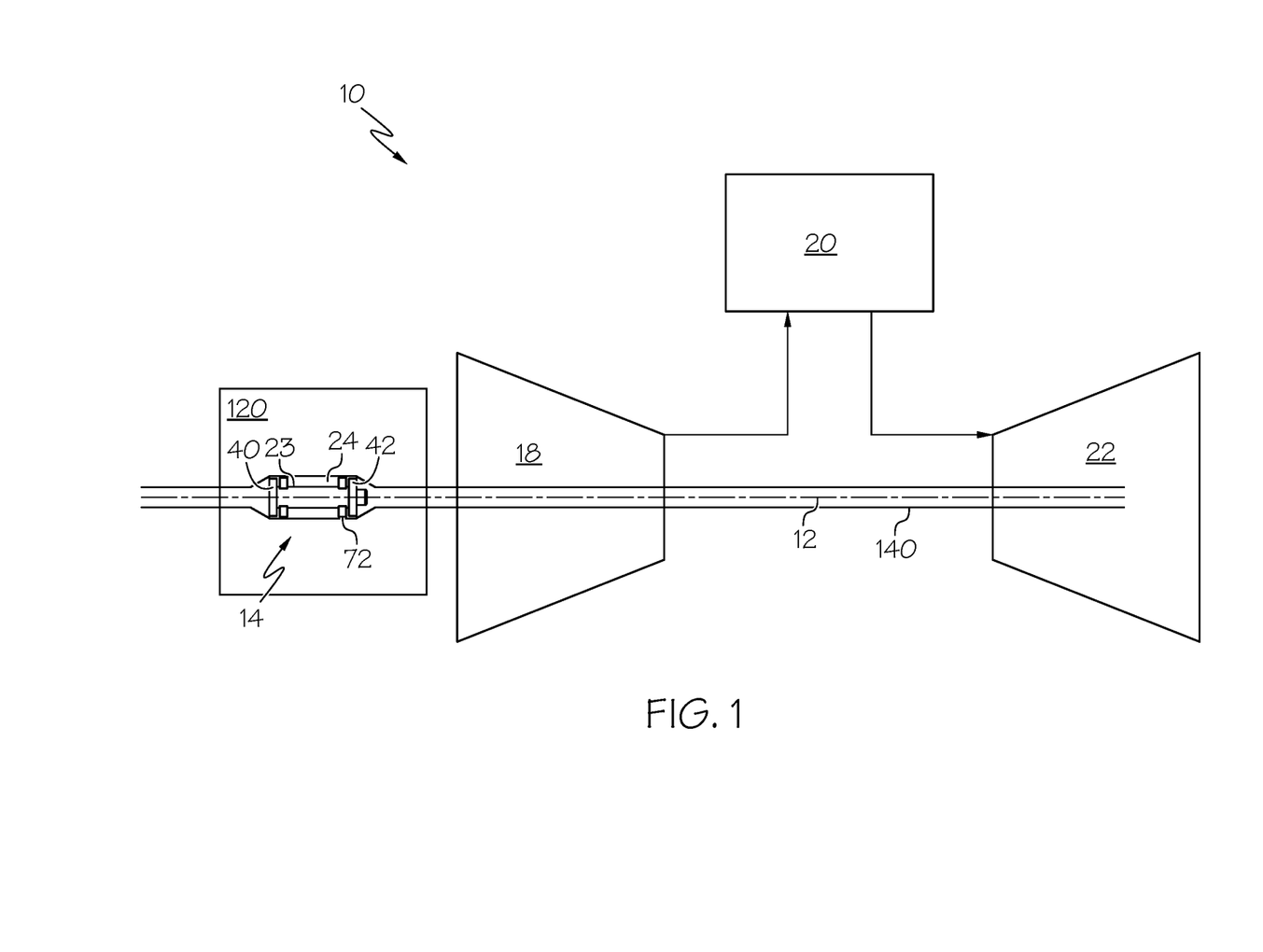
FIG. 1 is a schematic cross section view illustration of a gas turbine engine with an exemplary embodiment of a friction shaft damper for axial vibration mode.
Figure 2:
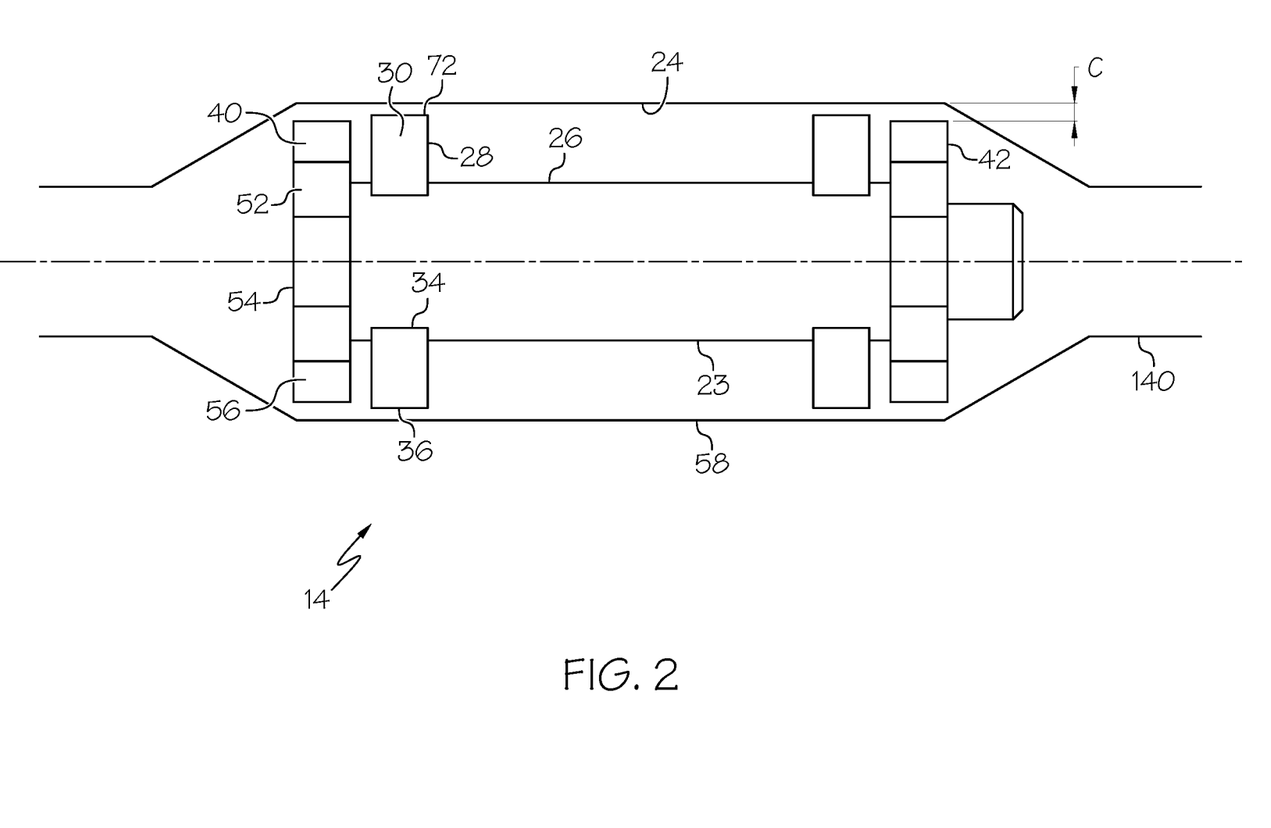
FIG. 2 is an enlarged schematic cross section view illustration of the friction shaft damper illustrated in FIG. 1.
Figure 3:
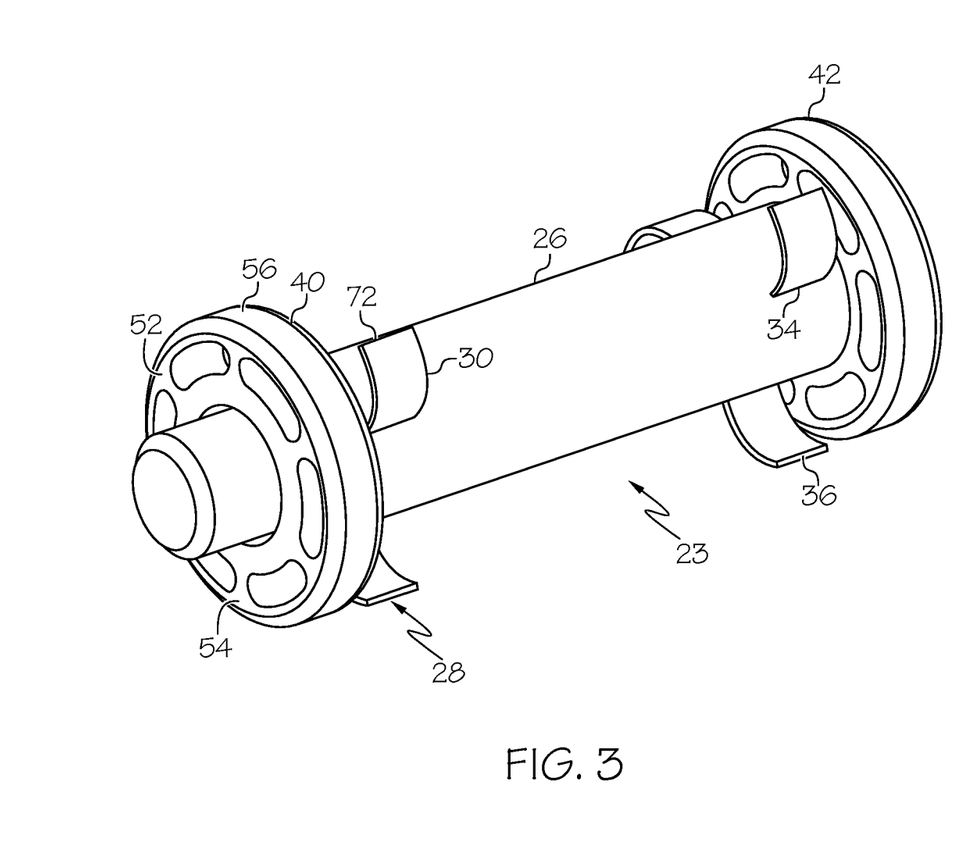
FIG. 3 is an enlarged schematic perspective view illustration of the friction shaft damper illustrated in FIG. 1.

Schematically illustrated in FIG. 1 is an exemplary gas turbine engine 10 circumscribed about a longitudinal centerline or axis 12 and including, in downstream serial flow relationship, a compressor section 18, a combustor section 20, and a turbine section 22. A drive shaft 140 drivingly connects the turbine section 22 to the compressor section 18. The engine 10 may be configured as an auxiliary power unit (APU) including an electrical generator 120 driven by the drive shaft 140. A friction shaft damper assembly 14, illustrated in FIGS. 1-3, is provided to damp axial vibration in the shaft 140. The friction shaft damper assembly 14 includes a friction shaft damper 23 located within the drive shaft 140 and pressing against an inside surface 24 of the drive shaft 140 with a spring force. The damper 23 works by sliding very small amounts in response to an axial vibration in the shaft while pressing against the inside surface 24 of the drive shaft 140 with a spring force, resulting in dissipation of energy. This acts to dampen the vibration.

Figure 6:
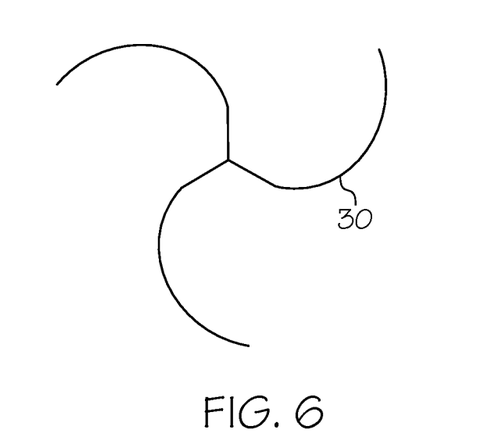
FIG. 6 is a schematic cross-sectional view of a first shape of a spring arm or finger of the friction shaft damper illustrated in FIG. 1.
Figure 7:
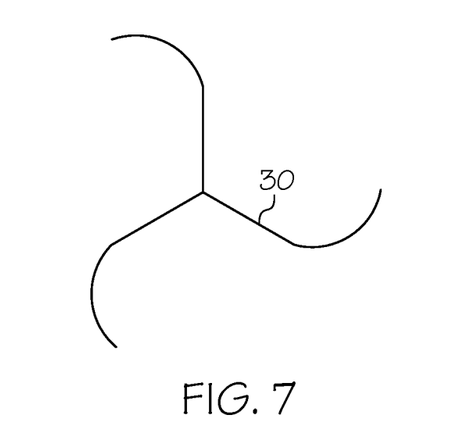
FIG. 7 is a schematic cross-sectional view of a second shape of the spring arm or finger of the friction shaft damper illustrated in FIG. 1.
Figure 8:
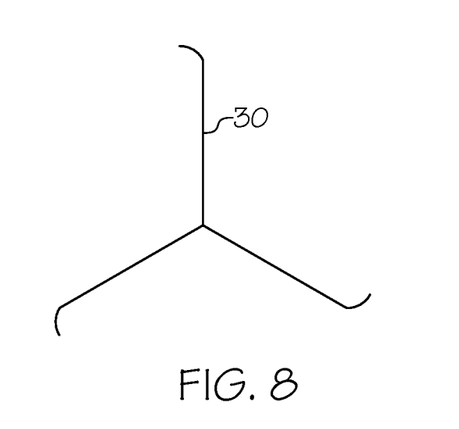
FIG. 8 is a schematic cross-sectional view of a third shape of the spring arm or finger of the friction shaft damper illustrated in FIG. 1.

The damper 23 includes a central mass 26 which is positioned inside the drive shaft 140 by two sets 29 of fingers 30. The central mass 26 is illustrated herein as being cylindrical in shape but could have another shape such as annular. Each set 28 has multiple fingers 30 equi-angularly spaced about the central mass 26 such as the three fingers 30 illustrated herein. The fingers 30 are secured and attached to the central mass 26 at radially inner ends 34 of the fingers 30. Radially outer ends 36 of the fingers 30 are positioned and free to axially slide along the inside surface 24 of the drive shaft 140. The exemplary embodiment of the fingers 30, as illustrated in FIG. 3, are spiral in shape and springy. The spirals may be logarithmic spirals. The fingers 30 may be springy to provide an initial radial pre-load against the inside surface 24 at assembly, and a low level of additional radial load due to centrifugal force during operation. Springy is defined as able to revert to original size and shape after being stretched, squeezed, or twisted. The springy fingers 30 may be made from a springy metal such as thin springy steel. FIGS. 6-8 schematically illustrate first, second, and third exemplary shapes that may be used for the spring arms or fingers 30 of the friction shaft damper 23 illustrated in FIGS. 1-3.

The damper 23 may also include at least two axially spaced apart annular deflection limiters 40 illustrated in FIGS. 1-3 as annular forward and aft deflection limiters 40, 42. Small clearances C between the annular deflection limiters and the inside surface 24 of the drive shaft 140 to prevent excessive deflection due to imbalance. The deflection limiters may include radial spokes 52 extending radially outwardly from annular hubs 54 circumscribing the central mass 26 to annular rims 56. An enlarged section or chamber 58 of the drive shaft 140 may surround and axially trap the damper 23.

Figure 4:
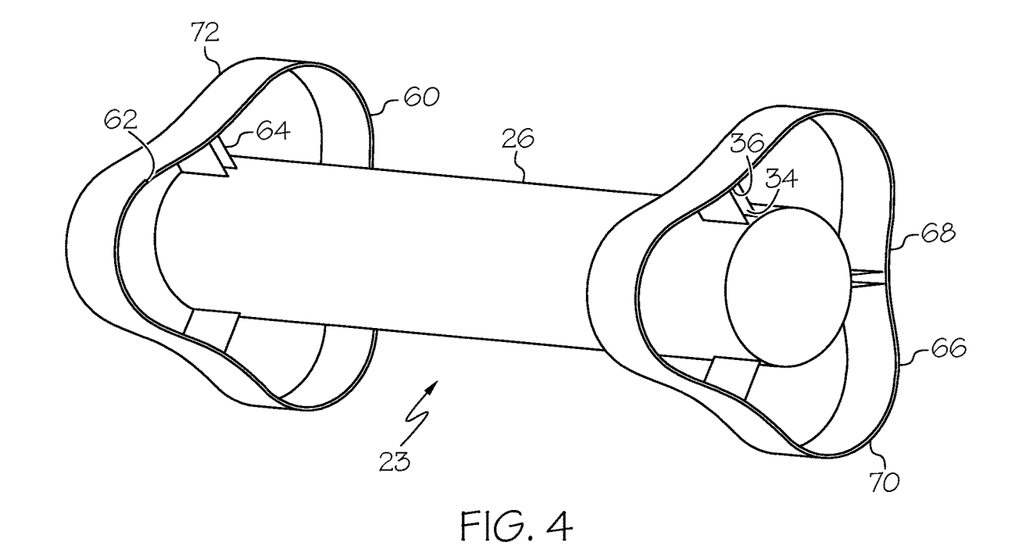
FIG. 4 is an enlarged schematic perspective view illustration of a second exemplary friction shaft damper illustrated in FIG. 1.
Figure 5:
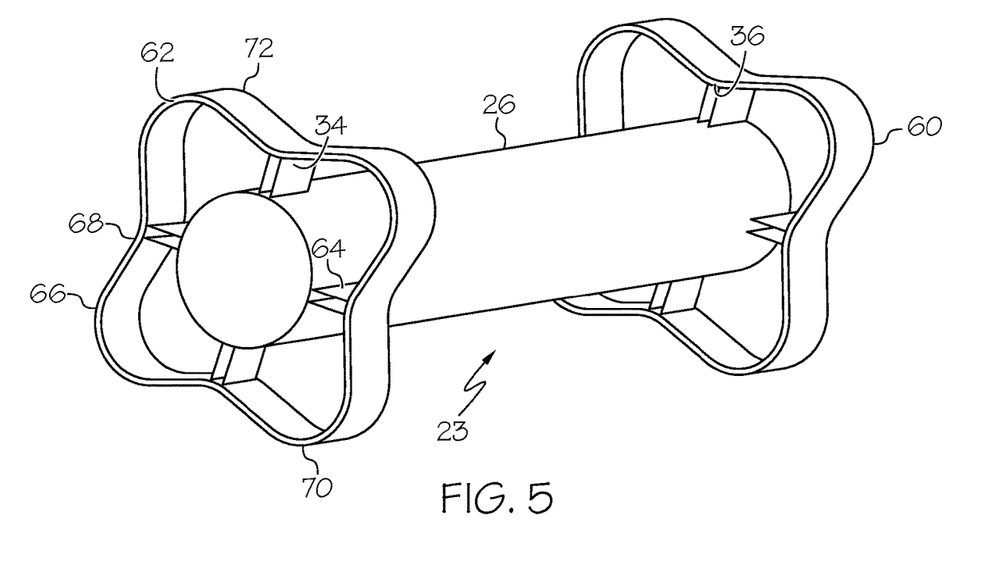
FIG. 5 is an enlarged schematic perspective view illustration of a third exemplary friction shaft damper illustrated in FIG. 1.

Alternative embodiments of the damper 23 are illustrated in FIGS. 4-5. The logarithmic spirals are replaced with multi-lobed wave springs 60 which provide pre-load against the inside surface 24 of the drive shaft 140, illustrated in FIGS. 1-2. The multi-lobed wave spring 60 includes a multi-lobed rim 62 attached or connected to the central mass 26 by struts 64. Radially inner ends 34 of the struts 64 are attached to the central mass 26 and radially outer ends 36 of the struts 64 are attached to the multi-lobed rim 62. The multi-lobed rim 62 has a wavy shape and includes lobes 66 and radially inner troughs 68 and radially outer crests 70.

A three lobe multi-lobed rim 62 is illustrated in FIG. 4 and a four lobe multi-lobed rim 62 is illustrated in FIG. 5. The radially outer crests 70 are positioned and free to slide along the inside surface 24 of the drive shaft 140. The radially inner ends 34 of the struts 64 are attached to the central mass 26. The radially outer ends 36 of the struts 64 may be attached to the radially inner troughs 68 as illustrated in FIGS. 4 and 5. The size and number of lobes can be tuned to control radial loads at speed. The multi-lobed wave spring 60 provides the functionality of both the fingers 30 and the annular deflection limiters 40. The fingers 30 and radially outer crests 70 are springy projections 72 extending outwardly from and attached or connected to the central mass 26 and slideably engaging the inside surface 24 of the drive shaft 140.

Figure 10:
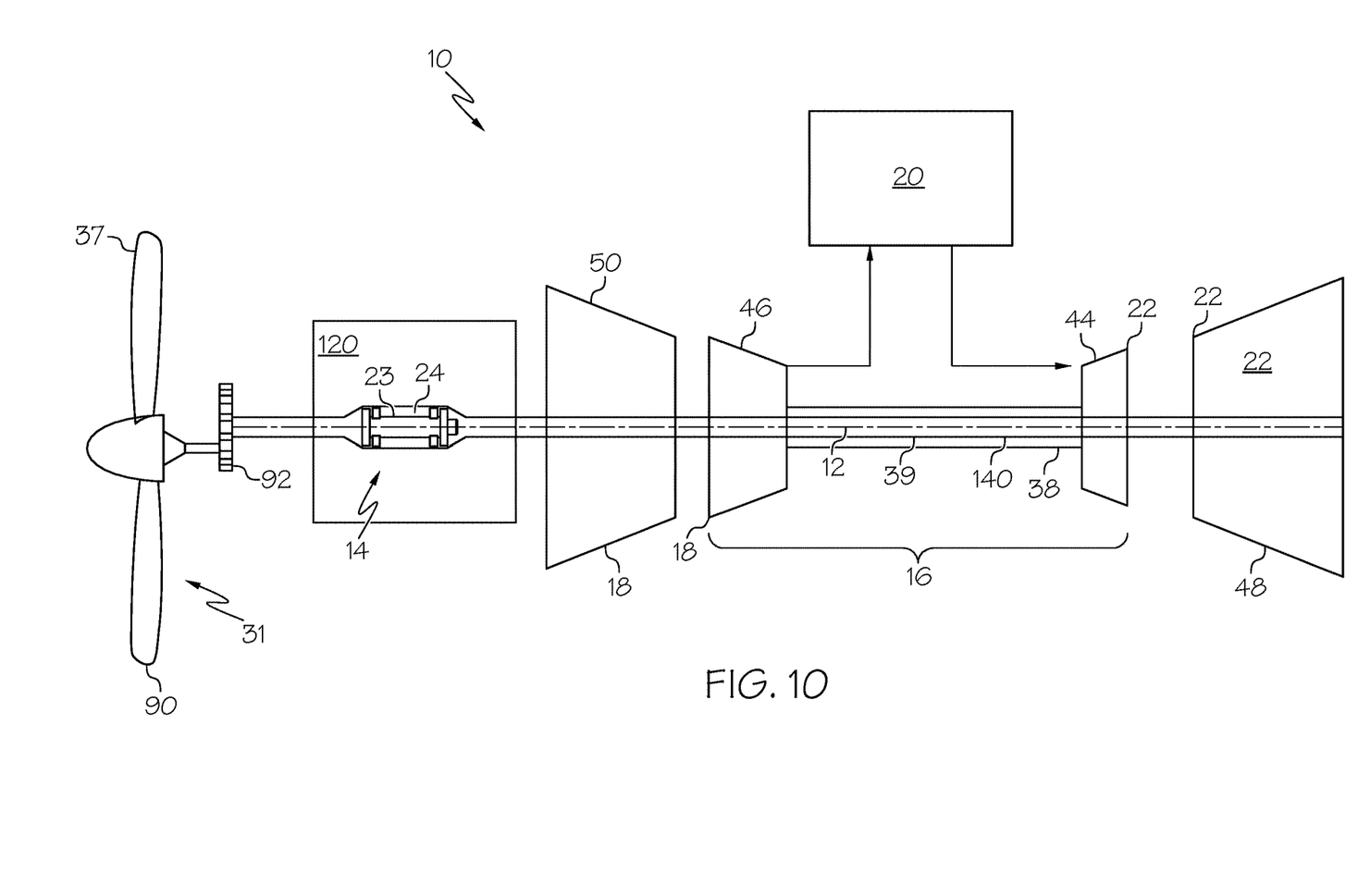
FIG. 10 is a schematic cross section view illustration of a turbo-prop gas turbine engine with an exemplary embodiment of a friction shaft damper for axial vibration mode.

Schematically illustrated in FIG. 10 is an exemplary turboprop engine 10 circumscribed about a longitudinal centerline or axis 12 and including, in downstream serial flow relationship, a compressor section 18, a combustor section 20, and a turbine section 22.

An outer shaft 30 drivingly connects a high pressure turbine 44 to a high pressure compressor 46. An inner shaft 39 drivingly connects a low pressure turbine 48 to a low pressure compressor 50 and a propeller 90 through gearbox 92. A propeller assembly 31 including propeller blades 37 of the propeller 90 then generates thrust, output horsepower, lift, or other force to move or provide energy to a surrounding apparatus (e.g., a fixed or rotary-wring aircraft, an auxiliary power unit, a marine or industrial power unit, etc.).

Figure 9:
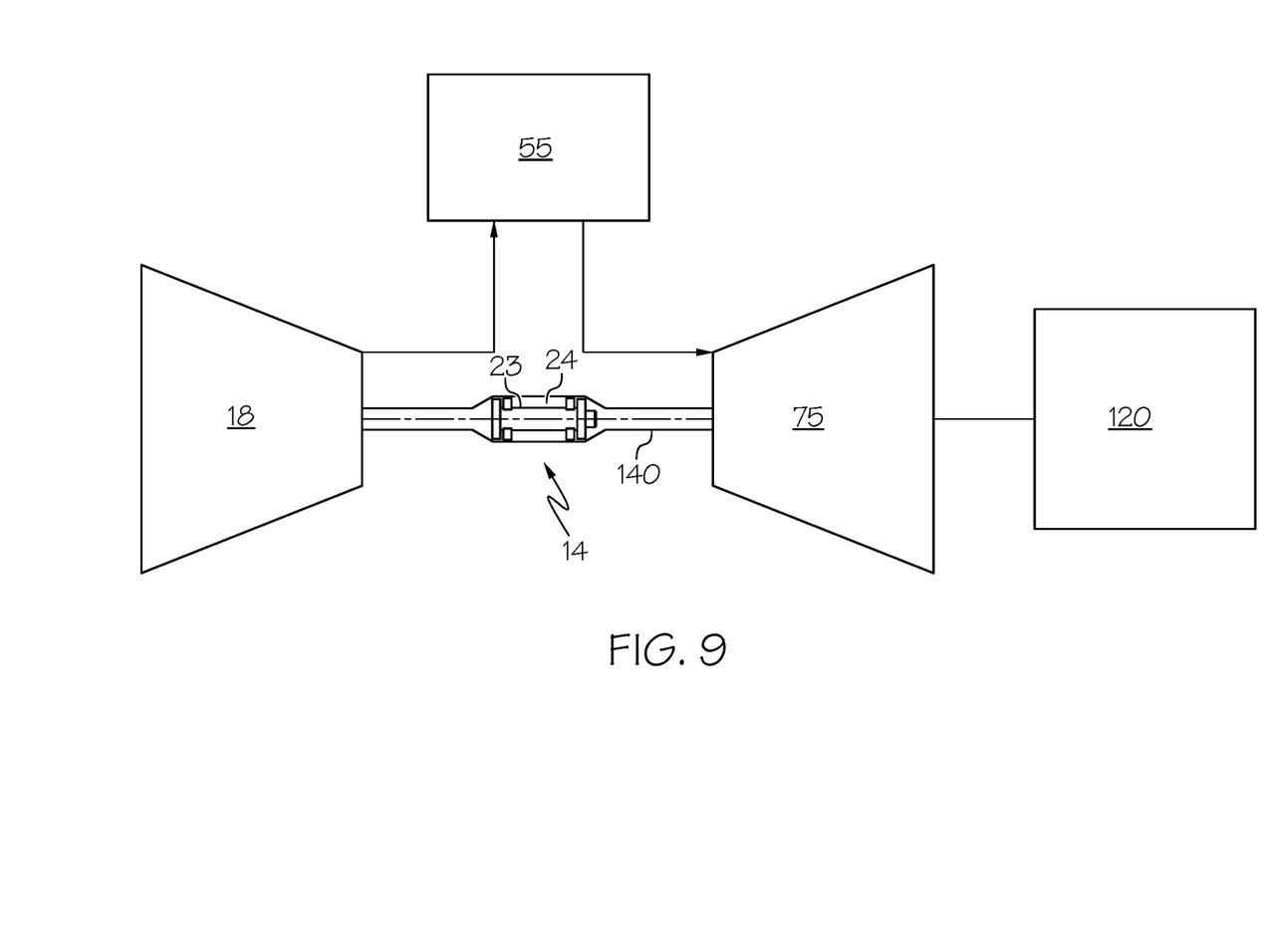
FIG. 9 is a schematic cross section view illustration of a second exemplary gas turbine engine with an exemplary embodiment of a friction shaft damper for axial vibration mode.

The engine 10 may be configured as turbofan as illustrated in FIG. 1 or a turbojet. Schematically illustrated in FIG. 9 is an engine 10 configured as an auxiliary power unit (APU), air turbine starters, land- or marine-based power generation units, or gas turbine engines for land, marine, or air apparatuses, including land and marine vehicles, missile propulsion, and rotary-wing or fixed-wing aircraft.

Figure 1A:
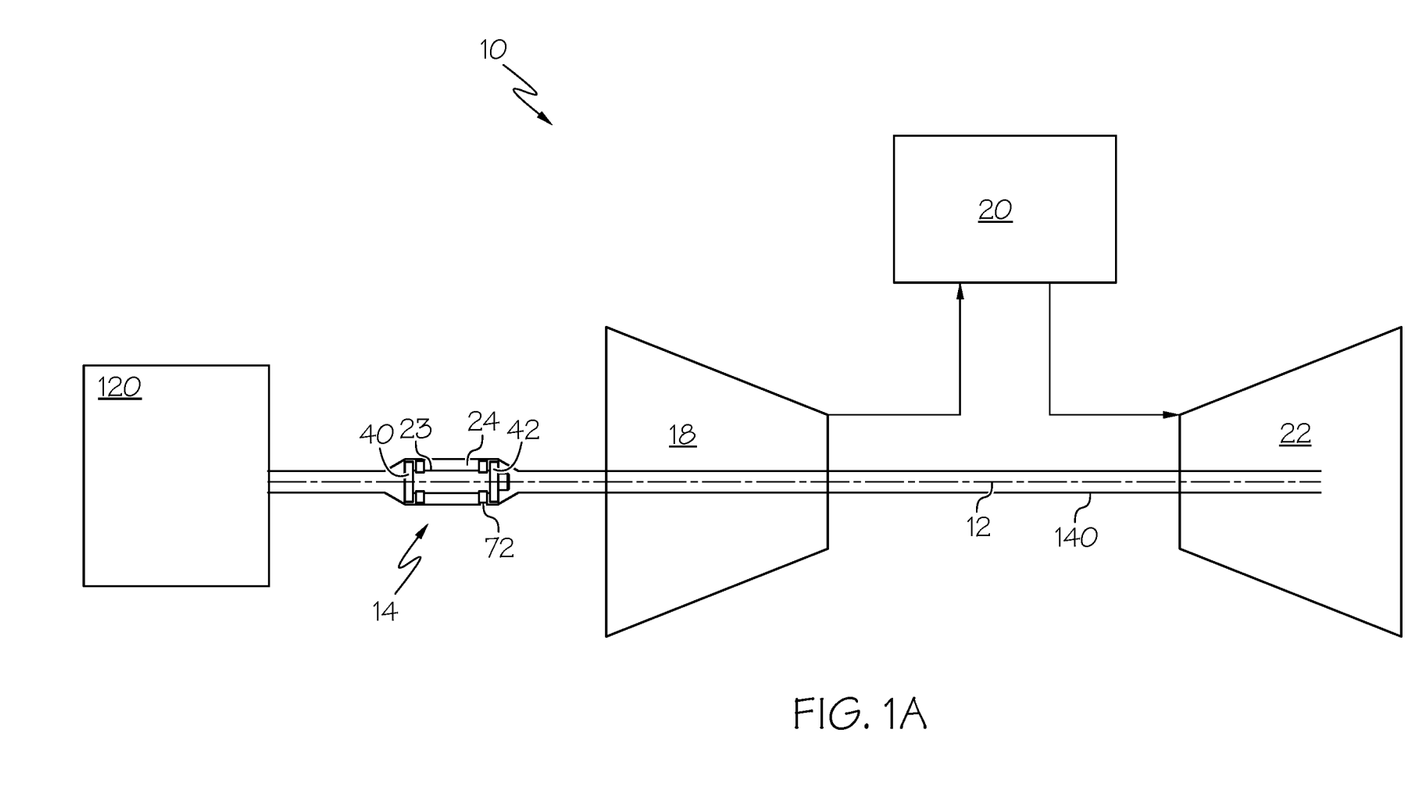
FIG. 1A is a schematic cross section view illustration of a gas turbine engine with an exemplary embodiment of the friction shaft damper illustrated in FIG. 1 in a shaft of the engine.

Turbine rotors in the turbine section 75 that are coupled via a drive shaft 140 to one or more compressors in the compressor section 18 and a fan or propeller assembly 31. The engine 10 includes an electrical generator 120 driven by, in downstream serial flew, a compressor section 18, a combustion section 55, and a turbine section 75. The compressor section 18, the combustion section 55, and the turbine section 75, together define a core engine 16. The electrical generator 120 provides energy to initially drive the compressor section 18 and turbine section 75 to feed air to the combustion section 55 for start-up/ignition. The electrical generator 120 may provide energy to one or more auxiliary systems, including computer devices or controllers, pumps, hydro- or pneumatic actuators, environmental control systems, thermal management systems, or lighting systems of the engine 10 and surrounding apparatus (e.g., aircraft). The damper 23 disclosed above may be disposed in an enlarged section or chamber 53 of the drive shaft 140. The damper 23, for example, may be located in the electrical generator 120 as illustrated in FIG. 1 or between the electrical generator 120 and the compressor section 13 as illustrated in FIG. 1A.

Figure 11:
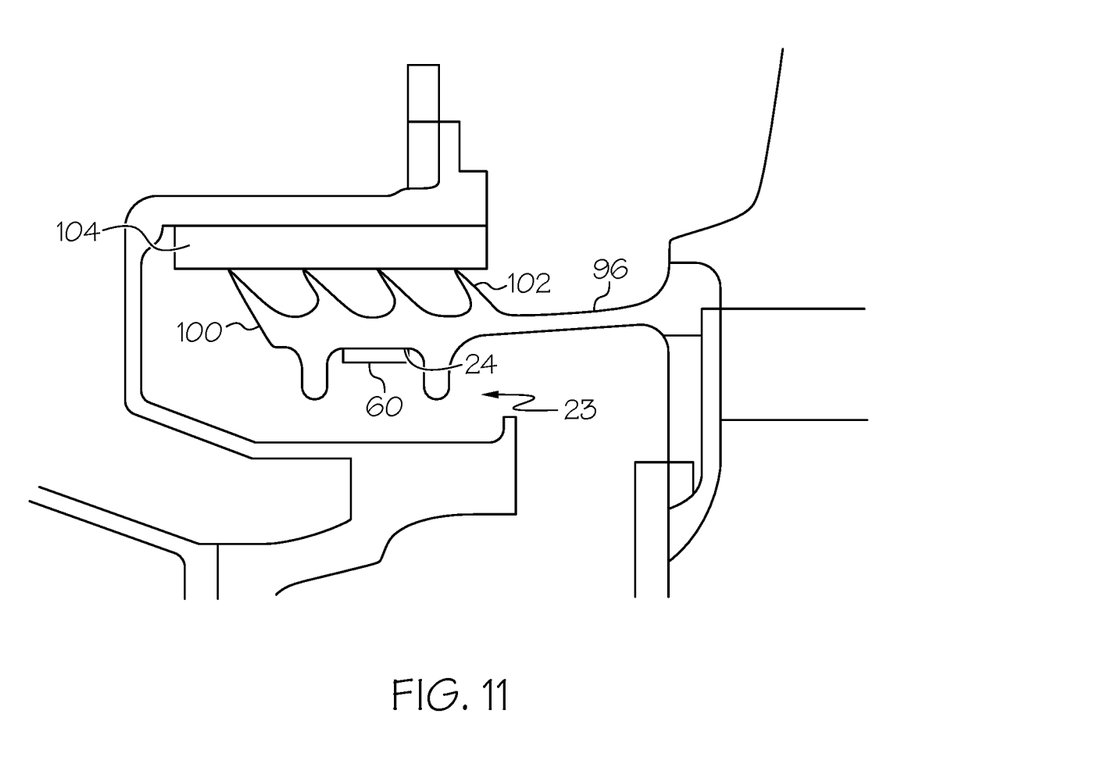
FIG. 11 is a schematic cross section view illustration of an alternative embodiment of the friction shaft damper with a multi-lobed wave spring free to slide along an inside surface of a rotor.
Figure 12:
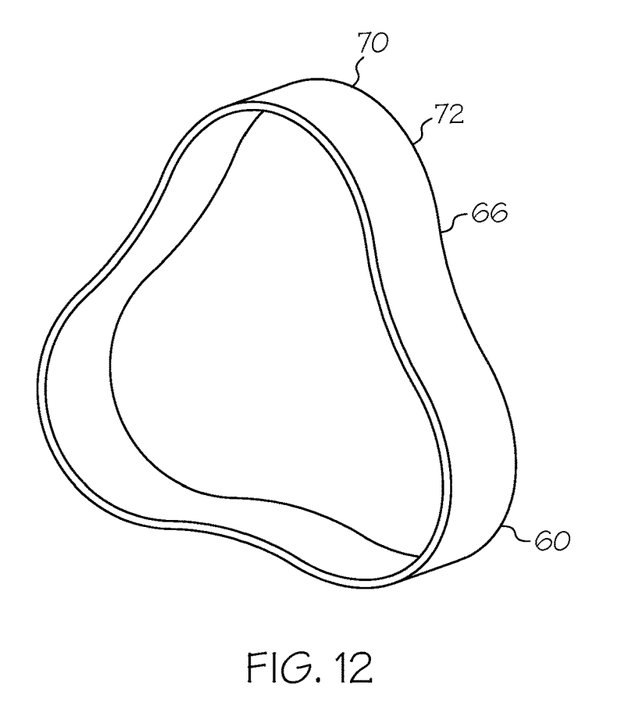
FIG. 12 is a schematic perspective view illustration of a three lobe embodiment of the wave spring illustrated in FIG. 11.
Figure 13:
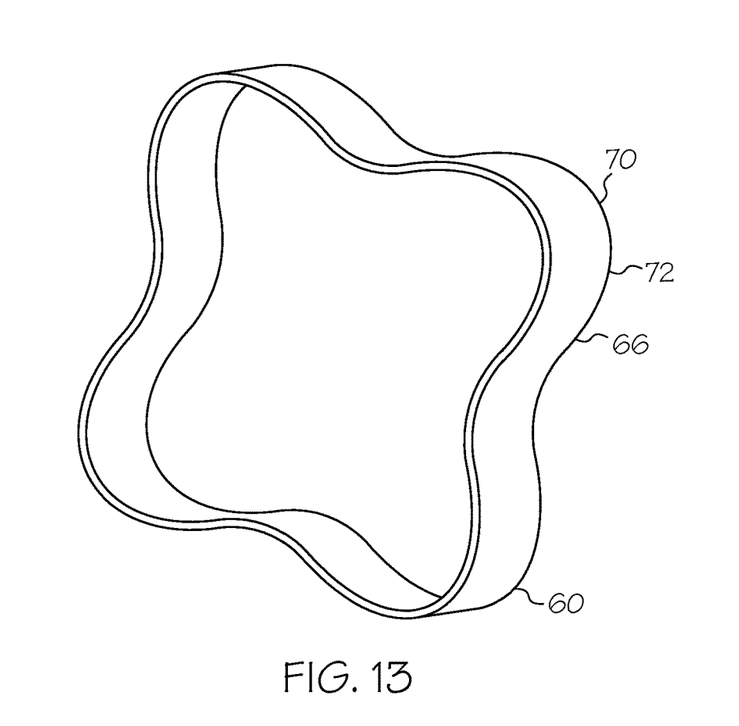
FIG. 13 is a schematic perspective view illustration of a four lobe embodiment of the wave spring illustrated in FIG. 11.

Another alternative embodiment of the damper 23, illustrated in FIG. 11, is multi-lobed wave spring 60 which provides pre-load against an inside surface 24 of a portion of a rotor 96 exemplified herein as a rotating labyrinth seal 100 having knife edge seals 102 which seal against a seal land 104. The multi-lobed wave spring 60 sits at least partially inside the portion of the rotor 96 of the engine. The multi-lobed wave spring 60 is illustrated herein as sitting at least partially radially inside the rotating seal 100. The multi-lobed wave spring 60 has a wavy shape and includes lobes 66 and radially inner trouqhs 63 and radially outer crests 70. A three lobe wave spring 60 is illustrated in FIG. 12 and a four lobe wave spring 60 is illustrated in FIG. 13. The radially outer crests 70 are positioned and free to slide along the inside surface 24 of the rotating seal 100. The radially outer crests 70 are springy projections 72 slideably engaging the inside surface 24 of the rotating seal 100.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A friction shaft damper assembly comprising a friction shaft damper including springy projections pressing against an inside surface of a portion of a rotor with a spring force, the springy projections extending outwardly from and secured to a central mass of the friction shaft damper, the springy projections comprising radially inner ends secured to the central mass and radially outer ends positioned and free to axially slide along the inside surface of the rotor.

2. The friction shaft damper assembly as claimed in claim 1, further comprising:
    the rotor including a drive shaft,
    the central mass positioned inside the drive shaft by the springy projections, and
    the springy projections slideably engaging the inside surface of the drive shaft.

3. The friction shaft damper assembly as claimed in claim 2, further comprising an enlarged section or chamber of the drive shaft surrounding and axially trapping the friction shaft damper.

4. The friction shaft damper assembly as claimed in claim 2, further comprising the springy projections including at least two axially spaced apart sets of springy fingers positioning the central mass inside the drive shaft.

5. The friction shaft damper assembly as claimed in claim 4, further comprising the fingers having a spiral shape or logarithmic spiral shape.

6. The friction shaft damper assembly as claimed in claim 2, further comprising at least two axially spaced apart annular deflection limiters around the central mass and small clearances C between the deflection limiters and the inside surface of the drive shaft.

7. The friction shaft damper assembly as claimed in claim 6, further comprising each of the annular deflection limiters including radial spokes extending radially outwardly from an annular hub circumscribing the central mass and the radial spokes extending radially outwardly to an annular rim.

8. The friction shaft damper assembly as claimed in claim 6, further comprising an enlarged section or chamber of the drive shaft surrounding and axially trapping the friction shaft damper.

9. A friction shaft damper assembly comprising a friction shaft damper including springy projections pressing against an inside surface of a portion of a rotor with a spring force, the springy projections extending outwardly from and secured to a central mass of the friction shaft damper, the springy projections comprising
    a multi-lobed wave spring having a multi-lobed rim secured to the central mass by struts, wherein radially inner ends of the struts are secured to the central mass and radially outer ends of the struts are secured to the multi-lobed rim.

10. The friction shaft damper assembly as claimed in claim 9, further comprising:
    the multi-lobed rim having a wavy shape,
    the multi-lobed rim including lobes, radially inner troughs, and radially outer crests, and
    the radially outer crests being positioned relative to and free to slide along the inside surface of the drive shaft.

11. The friction shaft damper assembly as claimed in claim 10, further comprising the radially outer ends of the struts attached to the radially inner troughs.

12. The friction shaft damper assembly as claimed in claim 11, further comprising an enlarged section or chamber of the drive shaft surrounding and axially trapping the friction shaft damper.

13. The friction shaft damper assembly as claimed in claim 9, further comprising the multi-lobed wave spring sitting at least partially inside the portion of the rotor.

14. The engine as claimed 13, further comprising the portion of the rotor including a rotating labyrinth seal having knife edge seals which seal against a non-rotating seal land.

15. A gas turbine engine comprising:
    in downstream serial flow relationship and circumscribed about a longitudinal centerline or axis a compressor section, a combustor section, and a turbine section;
    a rotor circumscribed about the longitudinal centerline or axis; and
    a friction shaft damper including springy fingers pressing against an inside surface of a portion of the rotor with a spring force, the springy fingers extending outwardly from and secured to a central mass of the friction shaft damper, the springy fingers comprising radially inner ends secured to the central mass and radially outer ends positioned and free to axially slide along the inside surface of the rotor.

16. The gas turbine engine as claimed in claim 15, further comprising:
    the rotor including a drive shaft,
    the central mass positioned inside the drive shaft by the springy fingers, and
    the springy fingers slideably engaging the inside surface of the drive shaft.

17. The engine as claimed in claim 16, further comprising an enlarged section or chamber of the drive shaft surrounding and axially trapping the friction shaft damper.

18. The engine as claimed in claim 17, further comprising:
    the central mass positioned inside the drive shaft by at least two axially spaced apart sets of springy fingers.

19. The engine as claimed in claim 16, further comprising:
    at least two axially spaced apart annular deflection limiters around the central mass and small clearances C between the deflection limiters and the inside surface of the drive shaft,
    each of the annular deflection limiters including radial spokes extending radially outwardly from an annular hub circumscribing the central mass, and
    the radial spokes extending radially outwardly to an annular rim.

20. The engine as claimed in claim 17, further comprising an electrical generator drivenly connected to the drive shaft and the enlarged section or chamber of the friction shaft damper located in the electrical generator.

* * * * *